(12) United States Patent
Spencer (10) Patent No.: US 10,933,900 B2
(45) Date of Patent: Mar. 2, 2021

(54) CLIMATE CONTROLLED STEERING WHEEL WITH COANDA EFFECT

(71) Applicant: Key Safety Systems, Inc., Sterling Heights, MI (US)

(72) Inventor: Byron Spencer, Bloomfield, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 16/211,935

(22) Filed: Dec. 6, 2018

(65) Prior Publication Data

US 2020/0180674 A1 Jun. 11, 2020

(51) Int. Cl.
*B62D 1/06* (2006.01)
*B62D 1/08* (2006.01)

(52) U.S. Cl.
CPC .................. *B62D 1/06* (2013.01); *B62D 1/08* (2013.01)

(58) Field of Classification Search
CPC .......... B62D 1/06; B62D 1/065; B62K 21/26; A63B 60/18
See application file for complete search history.

(56) References Cited

U.S. PATENT DOCUMENTS

| | | | | |
|---|---|---|---|---|
| 586,371 A | * | 7/1897 | Stein | B62K 21/26 74/551.9 |
| 3,149,501 A | * | 9/1964 | Keir | B62D 1/065 74/552 |
| 6,007,420 A | * | 12/1999 | Harm | B60H 1/00292 454/140 |
| 7,614,682 B1 | * | 11/2009 | Major | B60H 1/00292 296/154 |
| 2006/0121843 A1 | * | 6/2006 | Koval | B60H 1/242 454/152 |
| 2010/0089196 A1 | * | 4/2010 | Losio | B62K 21/12 74/551.9 |
| 2015/0158370 A1 | * | 6/2015 | Glaser | B60H 1/00292 454/69 |
| 2015/0329137 A1 | * | 11/2015 | Onica | B62D 1/065 165/59 |

FOREIGN PATENT DOCUMENTS

| | | | | |
|---|---|---|---|---|
| DE | 2115109 A1 | * | 10/1972 | ............. B62D 1/065 |
| JP | 59167368 A | * | 9/1984 | ............. B62D 1/065 |
| JP | 3213021 U | * | 10/2017 | ................ F04F 5/16 |

* cited by examiner

*Primary Examiner* — Thomas C Diaz (74) *Attorney, Agent, or Firm* — Meunier Carlin & Curfman LLC (57) ABSTRACT

A climate-controlled hand grip assembly that uses one or more air jets or air channels directed at a tangent to an outer surface of the hand grip assembly. The outer surface may be curved and the air flow path may bend with the curve to provide a film of conditioned air along the outer surface that spreads beyond the point of origin of the air flow path. An exemplary embodiment of a steering wheel device with a rim and spokes is disclosed wherein the outer surface of the rim, spokes or both can be enveloped with conditioned air using a Coanda Effect.

14 Claims, 6 Drawing Sheets

CLIMATE CONTROLLED STEERING WHEEL WITH COANDA EFFECT

FIELD OF THE INVENTION

The claimed invention relates to cooled and heated steering devices for vehicles and to air cooled and heated steering wheels.

BACKGROUND OF INVENTION

Heated and cooled steering wheels are generally known, see for example the following published patents and patent applications as cited by publication number: CN 2014432716; EP 2753530 A1; U.S. Pat. Nos. 4,679,730; 4,640,340; 6,481,312; 6,007,420; 6,862,807; 6,298,750; 7,614,682; 7,908,941; 8,993,929; 9,033,366; US20040261567; US 20040168540; US 20060121843; US 20090007721; US 20090114368; US 20130055849; US 20140090513; and US 20150197135.

While heated and cooled steering wheels are generally known there is a need for an improved steering wheel that can be cooled and heated.

SUMMARY OF INVENTION

A cooled or heated hand grip assembly is disclosed. Cooling or heating of the hand grip is accomplished using the Coanda Effect. As used herein the hand grip or hand grip assembly can be any of the rim or spokes of the steering wheel or shift knob or joy stick.

The invention solves one or more problems associated with managing the temperature climate at a hand grip control assembly by providing a mechanism to provide films of cooled or heated air. A preferred means to envelope includes an air delivery system with Coanda Effect.

Also contemplated by this invention is a steering device or steering wheel with a climate-controlled hand grip assembly that uses one or more air jets or air channels directed at a tangent to an outer surface of the hand grip assembly. The outer surface may be curved and the air flow path may bend with the curve to provide a film of conditioned air along the outer surface that spreads beyond the point of origin of the air flow path.

An exemplary embodiment of a steering wheel device with a rim and spokes is disclosed wherein the outer surface of the rim, spokes or both can be enveloped with conditioned air using a Coanda Effect.

DETAILED DESCRIPTION OF THE INVENTION

Disclosed herein is a steering device for a vehicle with an air flow path of cooled or heated air, e.g. conditioned air, over portions of its outer surface. The steering device may be a human machine interface of any sort including: a joystick, a steering wheel, handles, a shift knob or any other device suitable for hand control. The steering device is portrayed as a steering wheel or steering wheel assembly for a motor vehicle including a rim with one or more spokes. As portrayed in the preferred embodiments the air flow path is formed by flowing heated or cooled conditioned air employing a Coanda effect. The Coanda Effect occurs when airflow is closely projected to a parallel surface, such as a ceiling, or the walls of a duct system. When this occurs, the airflow is affected by the parallel surface it is flowing with. In simpler terms, air clings to surfaces as it moves.

In one broad sense there is provided a steering assembly for a vehicle comprising a hand grip assembly including: an outer hand grip contact or flow surface, an air channel with an origin or exit port proximate the contact or flow surface, air ducting internal to the hand grip assembly and in communication with the air channel. The air channel may be juxtaposed with the outer surface to entrain air with a Coanda effect. The relationship of the surface to air flow may be such that the air flow path bends to envelope portions of the outer hand grip contact or flow surface remote from the origin.

In another sense there is provided a climate controlled steering device for steering a vehicle comprising a hand grip assembly having an exterior, an external surface and an interior; and an air flow path. The air flow path may be made to pass from the interior of the hand grip assembly to the exterior at a tangent to the external surface. The air flow path may then have a lower pressure region disposed adjacent the external surface and a higher air pressure region disposed remote from the external surface.

In a particular embodiment there is provided a steering wheel assembly for a motor vehicle comprising: a rim with an external surface, the external surface having a curvature, an air channel with an air slot extending longitudinally with the external surface, and an air flow path enveloping the external surface beyond a region adjacent to the air slot causing the air flow to cling to the exterior surface as the air moves.

In certain embodiments the devices solve one or more problems associated with warming and/or cooling hands on or near the hand grip or both by providing a means to envelope portions of the hand grip with a film of conditioned air. The means to envelope portions of the hand grip with conditioned air may comprise a blower, HVAC, pump, heating element, cooling element, compressor, or other air delivery device. As such these devices condition the air and/or cause air movement.

The device may include an air flow path having an inlet or air opening and outlet or discharge port. The air flow path may be exterior to the steering device, interior to the steering device or both. The air flow path may be routed past the column assembly through a plenum around a clock spring through at least one of a plurality of spokes or ducts and into a hand grip assembly. The air flow path may be split and routed into the hand grip assembly via a plurality of entry points or angles to increase the combined cross-sectional area of air flow. Increasing the combined cross-sectional area of air flow through the hand grip assembly can increase total airflow volume through the system and/or heat exchange rate in the hand grip(s). The spoke(s) may include one or more baffles internally to block or channel air. A spoke baffle may close off one spoke so that air passing through the ducting entrance will flow radially outward along the spoke and circumferentially around the steering wheel rim. Air can exit through one or more air discharge ports and continue along an outer surface.

The device has one or more air channels, the air channels may be any suitable air opening. The air channels may be shaped and positioned to direct and bend conditioned air to affect an envelope over at least a portion of an outer surface of the hand grip assembly, including an area where an operator's hands may reside during one or more of use, rest, or vehicle operation. In exemplary embodiments the air flow path may include a portion where conditioned air is directed at a tangent to an outer surface of the hand grip assembly. The air flow path may turn or bend to follow the adjoining outer surface and envelope at least a portion of it. Conditioned air may be provided through one or more air channels or jets ultimately connected to an air source.

As mentioned, conditioned air may be provided by a suitable air source such as a blower, HVAC, or other suitable air generating and/or delivery device. The air channel in co-operation with the hand grip assembly outer surface may be shaped, formed, and positioned to create a Coanda Effect. Suitable air sources include those described in WO2018/052873 entitled "Climate Controlled Steering Wheel", the disclosure of which is incorporated herein by reference in its entirety.

A Coanda effect may be created by directing conditioned air at a tangent to a surface of the hand grip assembly. Suitable air channels for creating a Coanda effect may be ones shaped and positioned to direct a jet of conditioned air at a tangent to the surface of the hand grip assembly. Having the conditioned air path directed at a tangent to a surface can provide an air path that will bend with the surface of the hand grip assembly in an amount sufficient to follow and envelope at least a portion of the outer surface.

Air channels may be shaped, sized and positioned to provide a high volume of low-pressure air which exits through a plurality of slots to create a boundary layer flow of air along the surface utilizing a Coanda effect. Various embodiments may allow a lower discharge with lower noise levels for comparable heat transfer effect. For example in the case of a variable air volume (VAV) air conditioning system, greater turndown ratios may be accomplished. Air channels may be provided by creating a slot or channel in the face of a hand grip assembly. The slot shape and size may be controlled with an insert. The insert may be a decorative plug or cap. In certain embodiments a significant amount of air will follow a curvature of the hand grip(s), as opposed to discharging straight out of the device or perpendicular to the surface plane. The air flow path may include one or more linear or slot diffusers. Diffusers can allow for a greater length of contact with the surface. Diffusers can also provide for a greater heat transfer effect.

The air flow path may be drawn to and follow the outer surface of the hand grip, curving around with it. The bending of the air flow path may be due, in at least part, to the radial acceleration, slowing and turning of the air adjacent to the surface. With enough airflow the change in momentum can be balanced by an equal and opposite force on the surface supporting its weight. This may be accomplished when a surface is brought sufficiently close to the air flow such that the closeness restricts the entrainment in that region. As flow accelerates to try and balance the momentum transfer a pressure difference across the air flow can results and the air stream can be deflected closer to the surface in an amount sufficient to follow it.

Conditioned air may be provided by one or more air jets. An air jet may accomplish one or more of the following, directing air flow, changing air flow direction, changing the air flow path, changing air flow velocity, changing air flow volume, etc. Air jets can be shaped to reduce the cross-sectional area of the air flow path while increasing flow velocity and/or maintaining air flow volume. The air jets can be used to direct a primary air stream of conditioned air at a tangent to an outer surface of the hand grip assembly. Examples of a primary air stream include air from ducts, plenums, blowers, HVAC, etc. Air jets directed at a tangent to the hand grip assembly outer surface can create a region of lower pressure air adjacent to the outer surface of the hand grip assembly with a region of higher pressure generated more remote.

Air jets may be formed in any suitable manner. Air jets may be provided by creating a slot or channel in the face of a hand grip assembly. The slot shape and size of an air jet may be controlled with an insert. The insert may be a decorative plug or cap. Air jets may be used to create an air flow path that substantially bends with the curvature of the hand grip assembly outer surface. A pressure field can be generated between a zone around and after the origin of the jet where it gradually rises, and a zone before the point of the origin where the jet boundary layer separates at atmospheric pressure and gradually decreases.

In practice substantial air flow may be provided by air channels or air jets in an amount sufficient to create a noticeable temperature effect at a location away from the air exit point, e.g. point of origin. The amount of temperature effect may be 10% or more when compared to air exiting straight out of the origin at a distance of 10 mm, 15 mm, 20 mm or more form the origin. Under the right conditions of flow rate, surface curvature, surface smoothness, material composition, etc., the air flow path may wrap around the curved surface and encompass up to 45 degrees, 90 degrees, 180 degrees or more of the surface from the point of origin.

The steering devices as described may include other components including one or more of the following: a hub assembly; a column assembly; a clock spring assembly; air ducting or a ducting network, an air flow path, air bag, horn assembly, control buttons, shift paddles, a Peltier element and an HVAC system.

Figure 1:
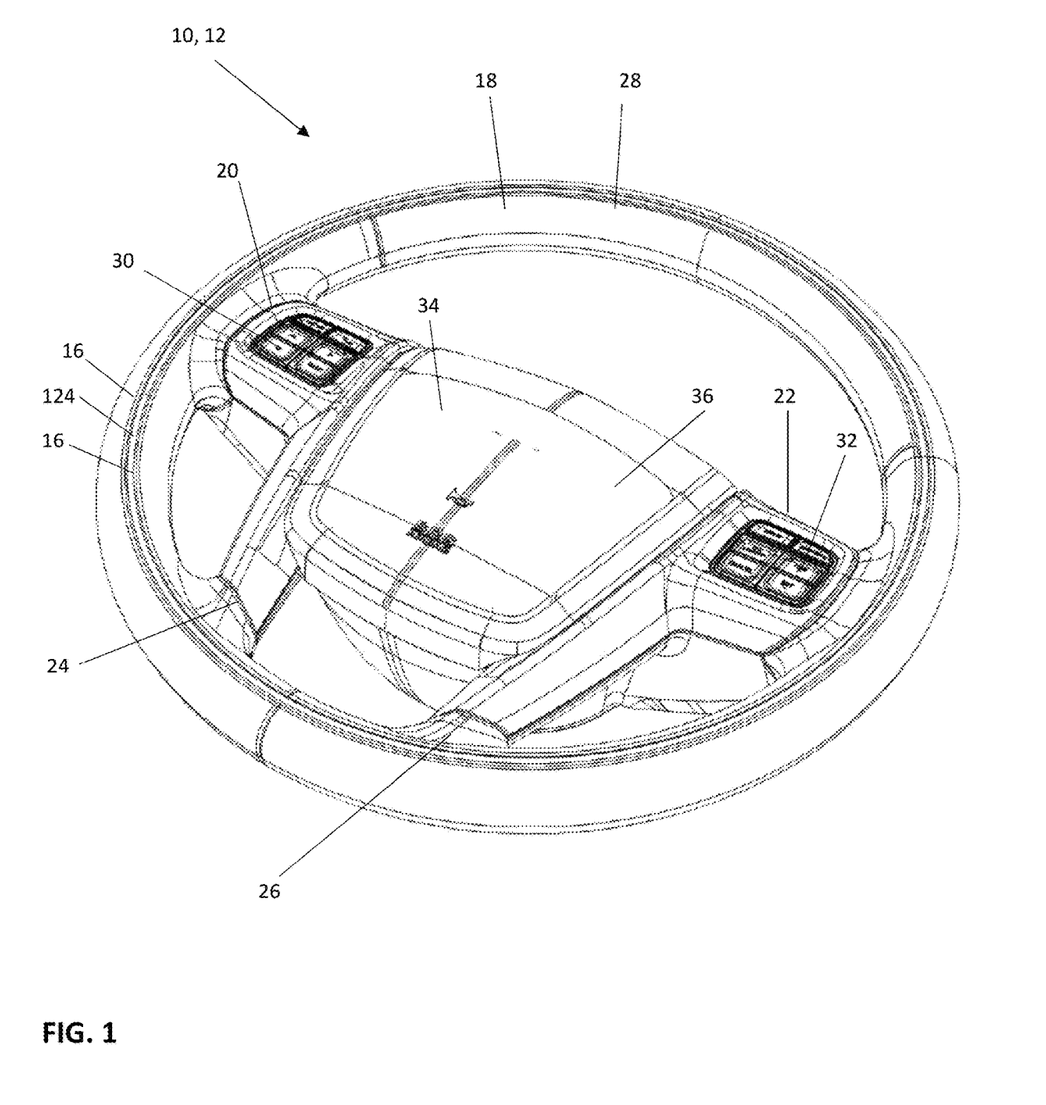
FIG. 1 is a perspective view of a steering device which can be heated and/or cooled by way of flowing cooled and/or heated air over portions of the outer surface of the hand grip(s)
Figure 1A:
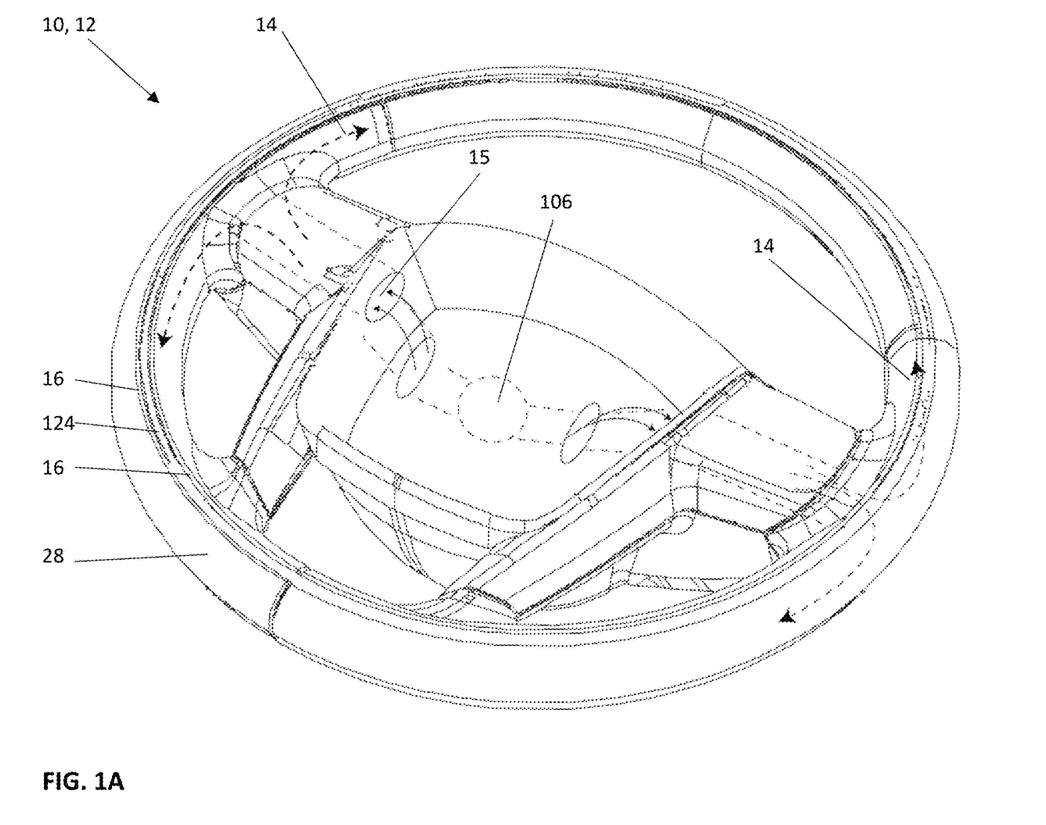
FIG. 1A shows airflow details of the present invention.
Figure 1B:
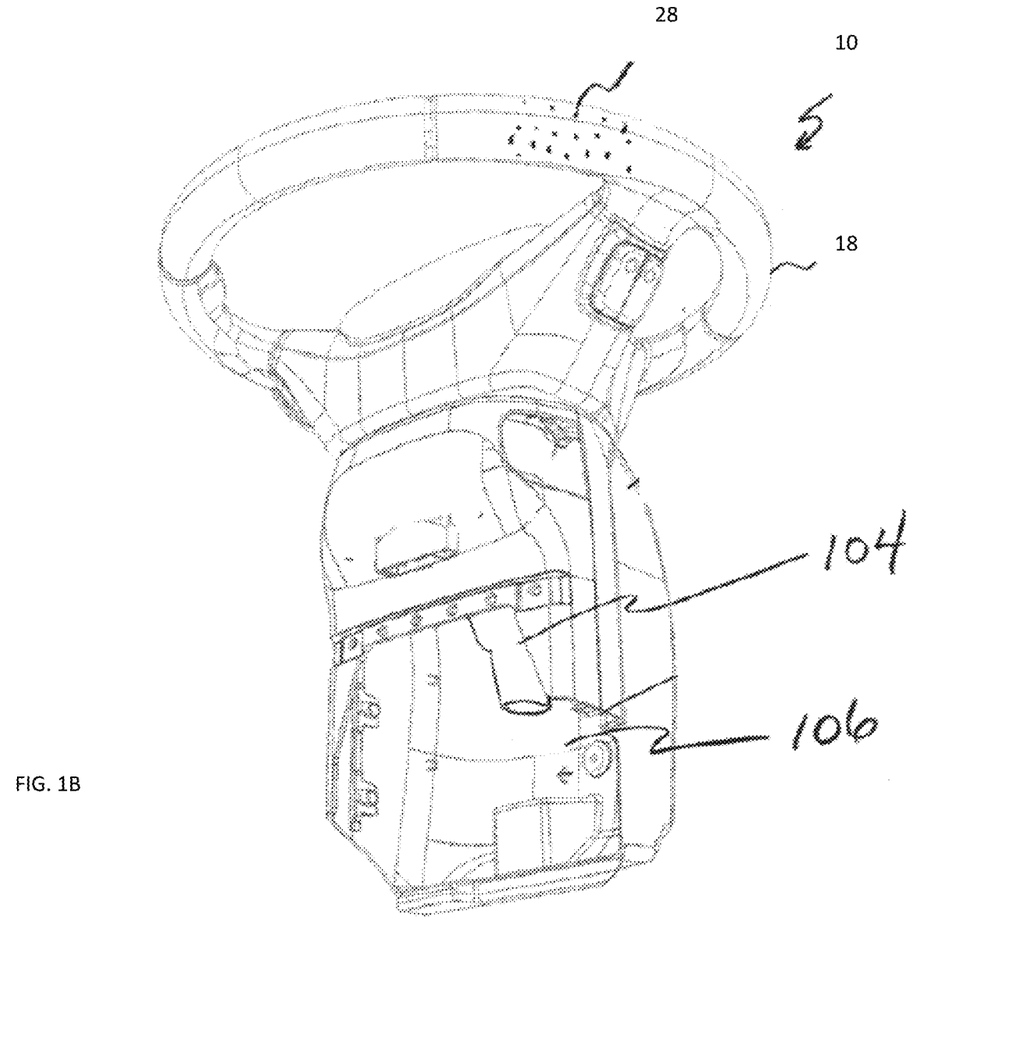
FIG. 1B shows exemplary air ducting.

Referring now to FIGS. 1, 1A and 1B, an exemplary embodiment shows a climate-controlled hand grip assembly 12 illustrated as a steering device 10, including rim 18, and an air flow path 14. While the steering device 10 may be any suitable steering means including a steering wheel, hand grip, joy stick, etc., as shown the steering device 10 is a steering wheel for a motor vehicle which includes a hand grip assembly 12 with a rim 18 and a plurality of spokes 20, 22, 24, 26. The hand grip assembly 12 has an outer surface 28 for contacting the hands of an operator, e.g. an outer hand grip contact surface. As can be appreciated the number of spokes will vary with the particular steering wheel device.

As shown in FIG. 1B, the exemplary steering wheel device 10, rim 18 and spokes 20, 22, 24, 26 coupled with a plenum assembly 104 are connected to air ducting all the way to an HVAC connection 106. As shown in FIG. 1A, air flows 14 can travel from the HVAC connection, through the steering wheel cover 112, through spokes 20, 22 of the hand grip assembly 12 and out the channels 15 to the steering wheel rim 18 and through the slots 16 in the rim.

Figure 2:
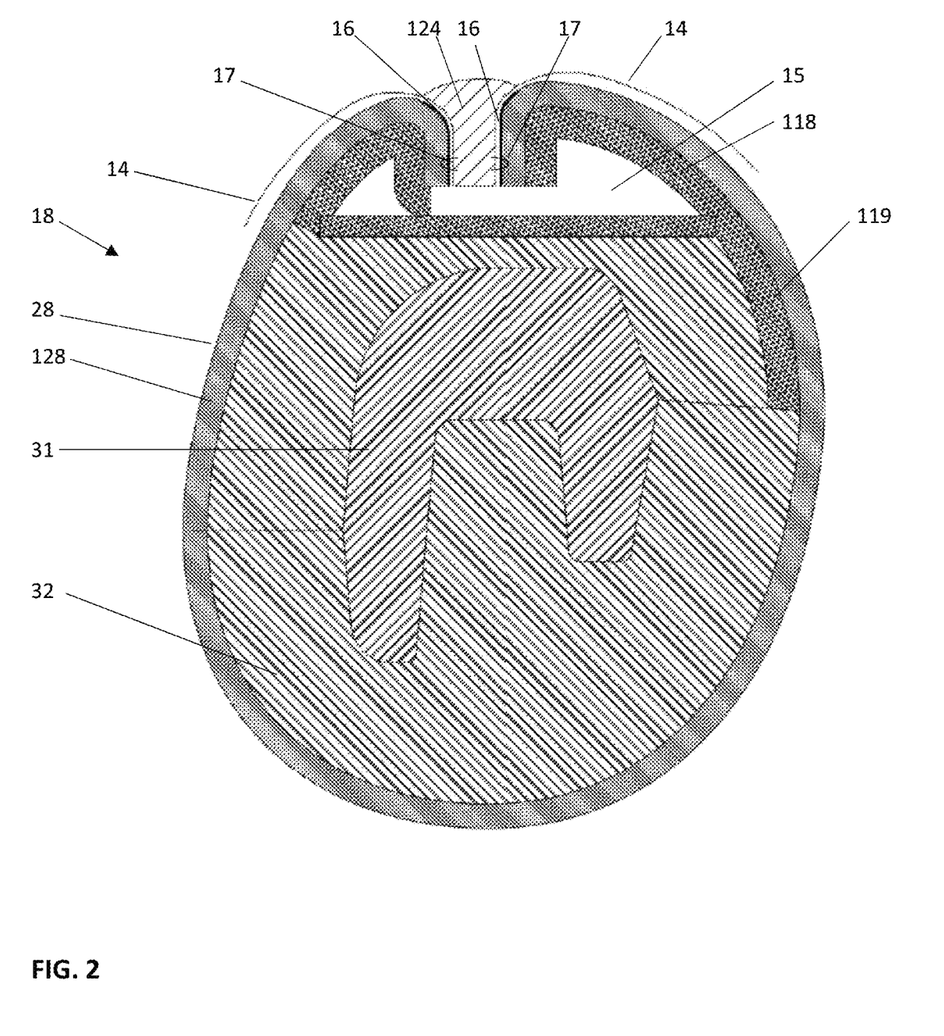
FIG. 2 is a cross sectional view of a steering assembly similar to FIG. 1.

The steering device 10 has one or more air channels 15, shown in greater detail in FIG. 2. A forward facing surface of the rim 18 can include for example a 360 degree channel 15, this can be filled by an insert 124. The insert 124 is loosely spaced in the channel 15 which provides air passages or slots 16 on either side of the insert 124. The insert is slightly offset from the walls of the rim by projections 17. As mentioned, the channel 15 and slot 16 in the rim 18 can be 360 degrees but can be segmented with the insert 124 made of multiple pieces. The air channels 15 are ultimately connected to a source of conditioned air 14, typically heated and/or cooled. This air source can be air from the air conditioning/heating system. The one or more air channels 15 are shaped and positioned to direct conditioned air 14 to the outer surface 28 of the rim 18 or the one or more spokes 20, 22, 24, 26 or both via the slots 16, this is basically shown in FIGS. 1-4 demonstrating how the Coanda Effect works. As shown the rim 18 is generally oval or circular and the air channel(s) 15 comprises one or more slots 16, as mentioned above, extending circumferentially around the rim 18. While an air slot 16 may extend about only a portion of the circumference of the rim 18 or length of a spoke 20, 22, 24, 26. As shown, there are two air slots 16 that are parallel to each other and extend the full circumferential length. Alternatively, the air slots 16 may comprise a group of staggered slots 16 also extending about a selected circumference of the rim 18. The slots 16 are preferably concentric and have different circumferences. In the case of a rim that is a continuous ring the slot(s) may extend 360 degrees around the rim 18.

The outer surface 28 of the hand grip assembly 12 has a curvature or is curved. The hand grip assembly curves along the longitudinal span (L), longitudinally, and the air flow 14 is traversal to the longitudinal direction, circumferentially (T). The air flow 14 path follows at least a portion of the curvature (T) traverse to the longitudinal direction.

Optionally, the steering device 10 can be fitted with one or more vehicle accessories including a horn, an air bag 36, or a plurality of accessory or control buttons 30, 32. The steering device 10 rim 18 has a core 31 which is finished with a covering. Suitable coverings include leather or synthetic cover 128 over foam padding 33, or other materials. The air flow 14 may pass by the covering 128 such as through or around it. This air flow 14 change can pass by the control buttons 30, 32.

Figure 3:
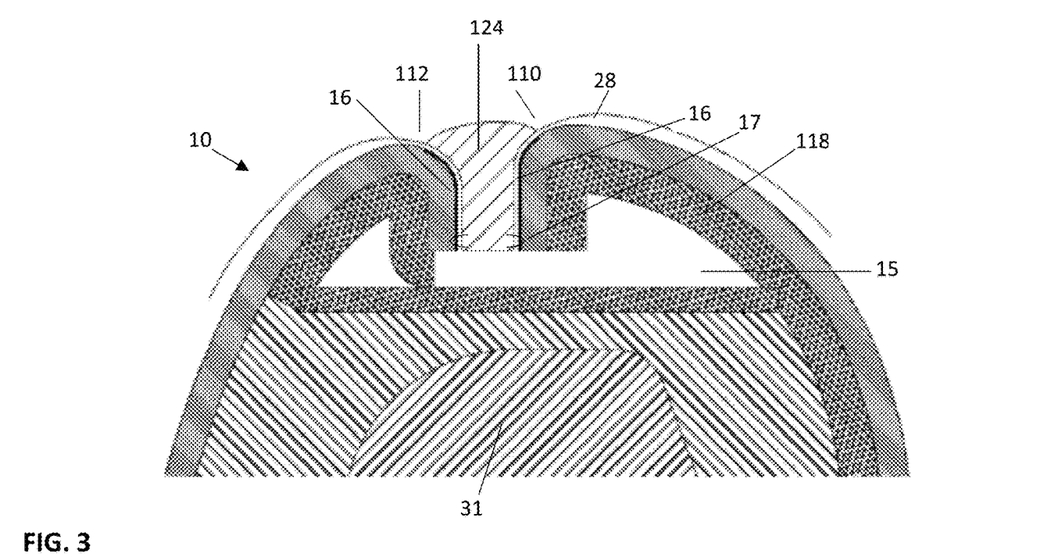
FIG. 3 is a magnified view of the steering assembly of FIG. 2.

FIG. 3 is an enlarged portion of the hand grip assembly or steering device 10 shown in FIG. 2. The steering device 10 has an outer hand grip contact surface 28. The surface 28 is curved following the core 31 of the steering device 10 which includes an armature aluminum or magnesium which is covered by a plastic 33 shown as mating sections. What's critical here is the normal top part of the rim 18 is truncated, this curved part is replaced with a mechanism 118 creating the various flow paths 14. There's a downward extension 119 of the flow path mechanism 118 shown on the right side of FIGS. 2, 3, 4, which allows this flow-path-mechanism 118 to be secured to the rim 18. This flow-path mechanism 118 can be made of plastic or metal and replaces the curved top structure of rim 18. Leather 128 can be applied in the normal way to cover the plastic rim 18 and now it covers the flow-path-mechanism 118 also. The leather cover 128 is wrapped around opposing ends of the flow-path-mechanism 118 and glued or welded. The flow paths 14 and slots 16 are between the leather 128 and insert 124. This can also be used with a steering wheel that does not use a leather covering. Regardless, the outer surface 28 is curved to create an opening for insert 124 which creates the flow passages or slots 16. The curvature may be sufficient in radius for accommodating the hands of a driver. As shown, the surface 28 of the steering device 10 is arched at or near each air slot 16 discharge port or origin 110, 112. Each air slot 16 is juxtaposed relative to outer surface 28 to encourage air to follow a tangential path down the sides of the steering device 10 using the Coanda Effect. The air flow path 14 of the gas exiting the discharge ports 110, 112 bends to envelope portions of the outer hand grip contact surface 28 remote from the ports 110, 112. The insert 124 is placed with an opening between opposition portions of the outer surface 28 creating two air slots 16 directed in different directions. The insert 124 may be a decorative plug or cap which may be opaque or clear. The air channels can be foil lined, the foil can be complementary to the surface of the insert 124 over a portion of their respective mating lengths. The insert 124 has a wall 126 that curves with an interior wall of the rim 18 As the interior wall 138 of the rim forms into an exterior wall 138' the wall 126 of the insert discontinues while the curvature of the rim wall 138, 138' continues creating a tangent 130 at the air discharge port 112. The steering device 10 may be formed of any suitable structure, materials or arrangements. As shown the steering device 10 includes an armature 31. The armature 31 provides a structural member to support the hand grip(s). The armature 31 may be made of cast or machined, or stamped metal, a composite, polymer or other structural material. In this embodiment, the armature 31 provides at least part of a solid inner core member of the steering wheel device 10. The armature 31 is typically covered with a hard foam polyurethane core layer. In this steering wheel device 10, two foam layers are used. An upper layer and a lower layer. Together they provide the often circular or oval shape known to the rim 18 of the steering wheel device 10. Both foam layers are covered by a finish covering. The outer covering may be leather, synthetic or other material.

The upper and lower core layers and forms the center of the rim 18 and may longitudinally span at least part of the inner rim member or the full circumference. The armature 30, as in typical steering wheel devices, extends through the one or more spokes to a hub or hub assembly.

The steering device 10, includes air ducting 118 or a ducting network which is part of the rim 18. The air ducting 118 is disposed on top of the upper foam core layer 134 and provides the upper structure of the rim. In the embodiment to be discussed, the top of the upper foam layer 134 has a flat surface 1134 upon which a port of the air ducting 118 is positioned. The ducting may be in fluid communication with air ducting routed through the one or more spokes. As shown, the air ducting or channel 15 runs along a designated portion of the hand grip assembly forming a port of the outer section or portion of the rim. The air ducting or channel 15 includes a duct base wall and a top wall. Disposing the ducting in an outer portion of the hand grip assembly can allow for a solid core, more directed air flow, structural integrity, conductive thermal transfer through the outer wall, and assists in creating the structure needed to achieve a Coanda Effect air flow as well as other advantages. Such ducting may be offset towards a hand side or an upper quadrant of the hand grip assembly. In that case the air ducting can be routed outside the inner core within the skin. Alternatively, the air flow path may be provided by a hollow member or a hollow rim.

The outer surface 28 of the hand grip assembly 12 is arched or curved proximate each air discharge port 110, 112. The one or more air channels 16 are in fluidic communication with the one or more air ducts 15. The one or more air channels 16 can receive air from an air duct and direct the air at a tangent to the outer surface 28. While other arrangements are possible, in this embodiment the air channels 16 each have a cross-sectional area that is less than that of the associated air duct(s). As may be appreciated from this disclosure the air channels may be formed as air jets that receive air from one or more air ducts.

Figure 4:
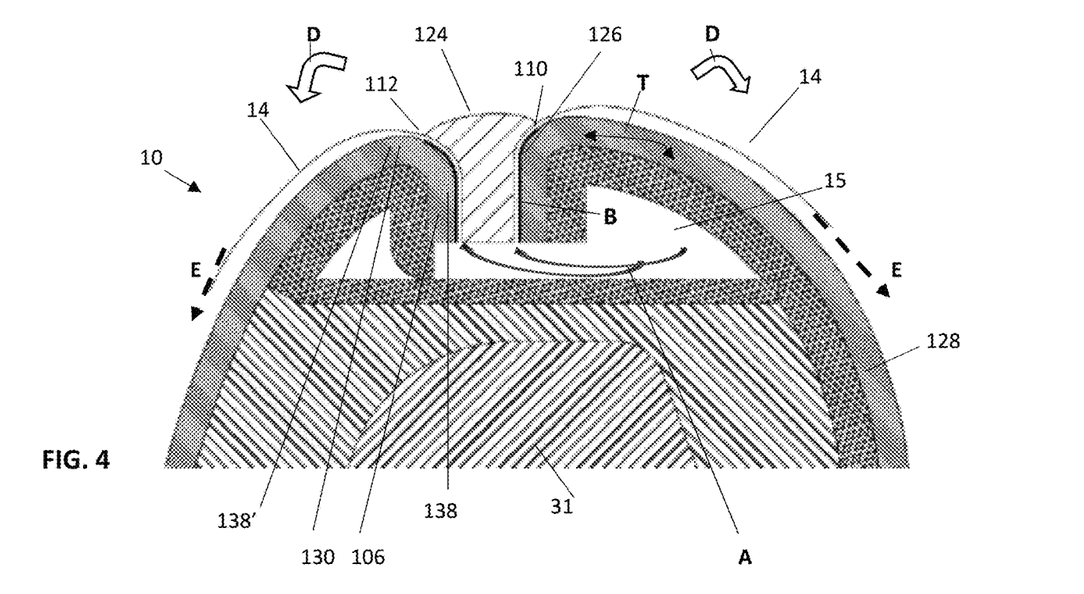
FIG. 4 is a schematic view of the steering assembly of FIG. 3 showing an exemplary air flow.

Referring mostly now to FIG. 4, shown therein at 10 is a steering device with an exemplary air flow path 14 showing air flow from the ducting 15 through the air channels 16 and out the discharge ports 110, 112. The air flow 14 is shown with arrows and the blanket of air is depicted at 14. Air flow through the system may include air flow: from the ducting (A), through the air channels (B), out the discharge port (C), bending with over the outer surface (D) and along the outer hand grip assembly (E). The air flow out the discharge port (C) is directed at a tangent to the outer surface. The air flow path 14 bends to blanket the outer surface 28 at a substantial distance from the origin 110, 112. While the air flow path 14 of the rim 118 may be provided by any suitable means, the blanketing of the outer surface may be by a Coanda Effect.

As may be appreciated from this specification there is provided a method of temperature, climate controlling a steering device including providing condition air (heated or cooled air) through ducting to one or more air channels and out a discharge port where the air flow bends with a contour of the outer surface without additional walls or structural outer boundaries (e.g. unbounded except at to the face of the outer surface). An external heating or cooling effect can then be received from a blanket of conditioned air over the outer surface at a distance from the discharge port using a Coanda Effect.

Figure 5:
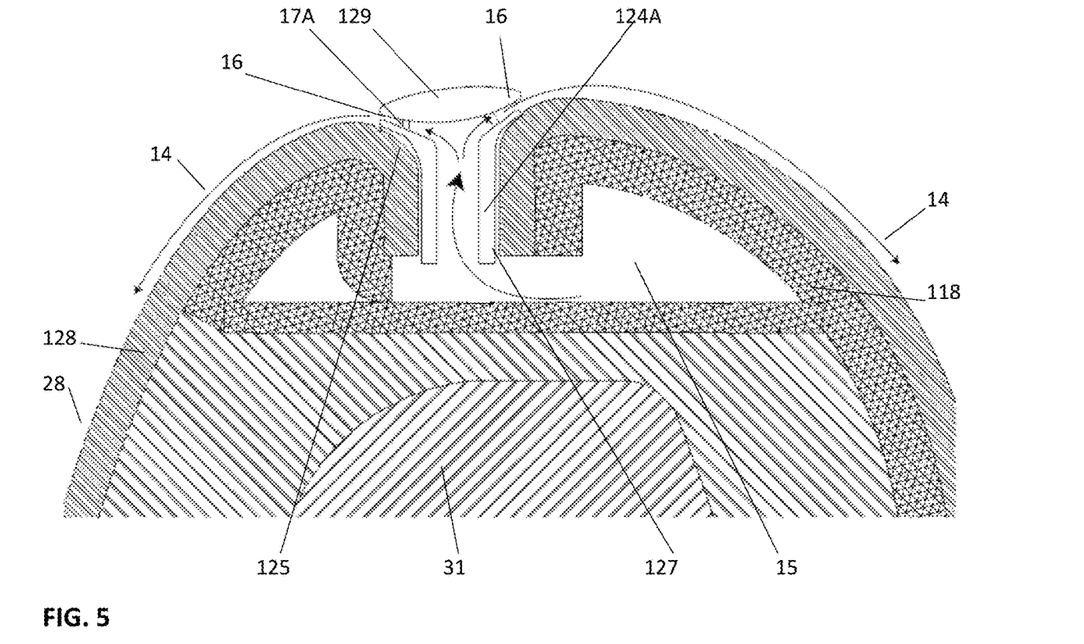
FIGS. 5 and 6 are cross-sectional views of an alternative embodiment of the steering assembly.
Figure 6:
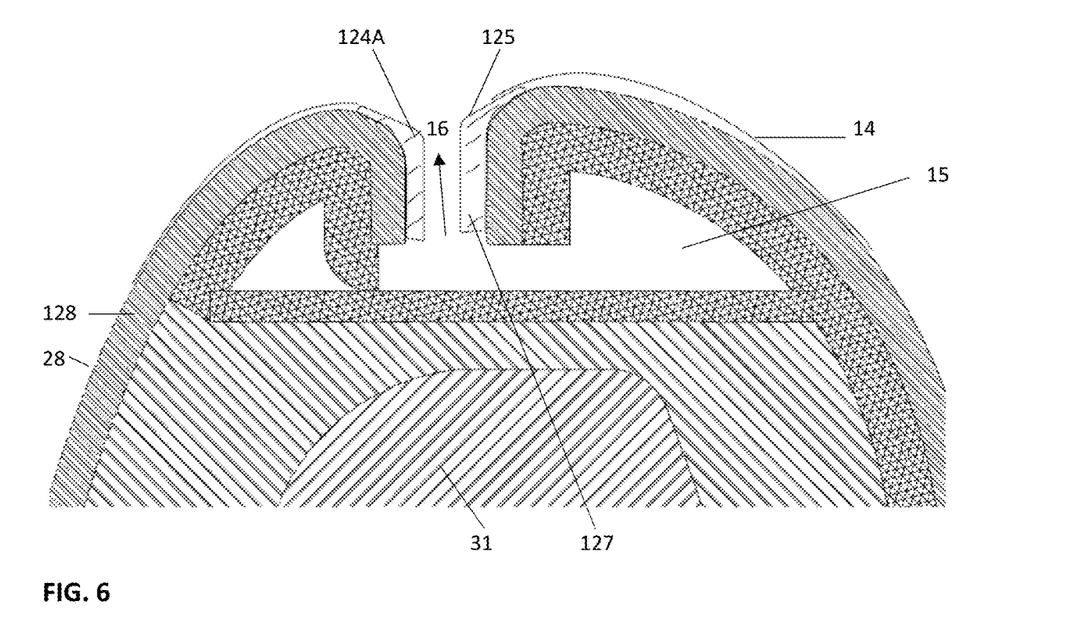

In the primary embodiment steering device 10 shown in FIGS. 1-4, the lateral flowing air paths 14 are formed between the insert 124 and the leather cover 128. In the alternative embodiment shown in FIGS. 5 and 6, the insert 124A has a downwardly extending tube 127 that fits in between the leather 128. The insert 124A can be formed as a ring shape, circumferentially continuous part or segmented or even a plurality of spaced tubes positioned about the rims circumference to achieve the desired Coanda Effect. The downwardly extending tube 127 is hollow and the laterally extending air passages are formed between a top oval portion 129 of the insert 124A located at the top of this downwardly extending tube. As shown in FIG. 5, the tube 127 has a flared end 125 at the upper surfaces of the rim 18 and the oval portion 129 is affixed to the flared end 125 locally by spaced connections 17A, the slots 16 lie between the connection 167A and direct the air path 14 to achieve the Coanda Effect. The alternative embodiment shown in FIG. 6 is the same as FIG. 5, but without the oval top portion 129 in this embodiment, the air from the channel 15 flows out.

Throughout the drawings and specification like numerals refer to similar components. In the specification features of specific embodiments can be selected in isolation from each other and combined with other embodiments even if only described in relation to a specific embodiment only. As can be appreciated by the written description and drawings there is an ample teaching and suggestion of how to combine generally discussed features with alternative embodiments disclosed in the specification.

While the invention has been illustrated in the foregoing description, the same is to be considered as illustrative and not restrictive in character. Therefore, it should be understood that only the preferred embodiments have been shown and described particularly and that all changes and modifications that come within the scope of the claimed invention are desired to be protected.

What is claimed is:
1. A hand grip assembly for a vehicle comprising:
   a steering device including an outer hand grip contact surface and an outer hand grip interior wall and defining an air slot with an outlet proximate to the outer hand grip contact surface;
   an insert disposed within the air slot and comprising a wall, wherein a curvature of the insert wall follows a curvature of the outer hand grip interior wall; and
   an air ducting channel internal to and defined by the steering device and in communication with the air slot, wherein the outlet of the air slot is disposed between the insert wall and the outer hand grip interior wall, wherein the curvature of the insert wall and the curvature of the outer hand grip interior wall cause the air flowing from the air slot to be directed along a tangential path to the outer hand grip contact surface to entrain the air with a Coanda Effect, which causes the air to bend to envelope portions of the outer hand grip contact surface that are spaced remotely from the outlet, wherein the insert divides the air slot such that the air flowing from the air slot is oriented in different directions.

2. The hand grip assembly of claim 1 wherein the steering device comprises one or more spokes and a rim supported by the one or more spokes.

3. The hand grip assembly of claim 1 wherein the outer hand grip contact surface has a curvature and the air flowing from the outlet bends with the curvature.

4. A climate controlled steering device for steering a vehicle comprising:
   a hand grip assembly having an external surface, an internal surface, and an interior;
   an insert disposed within the interior and comprising a wall, wherein a curvature of the insert wall follows a curvature of the internal surface of the hand grip assembly;
   the hand grip assembly defining an air flow path, the air flow path extending from the interior of the hand grip assembly, between the insert wall and the internal surface, and out to the external surface, wherein the curvature of the insert wall and the curvature of the internal surface cause the air flowing from the interior to flow along a tangential path to the external surface such that the air flowing from the air flow path has a lower air pressure region disposed adjacent the external surface and a higher air pressure region disposed remotely from the external surface, wherein the insert divides the air flow path such that the air flowing from the interior is oriented in different directions.

5. The climate controlled assembly of claim 4 wherein the hand grip assembly is an elongated hand grip with a longitudinal span (L), the external surface having a curvature (T) transverse to the longitudinal span (L), wherein the air flow path defined by the hand grip assembly directs the air along the tangential path to the external surface and a portion of the air bends with the curvature (T).

6. The climate controlled assembly of claim 4 wherein the hand grip assembly includes a solid inner core and air ducting adjacent to the solid inner core, the air ducting extending along the interior of the hand grip assembly, wherein the air ducting defines the air flow path.

7. The climate controlled assembly of claim 4 wherein the hand grip assembly is a steering wheel including a rim supported by one or more spokes.

8. The climate controlled assembly of claim 7 wherein the air flow path includes an outlet and the outlet is disposed such that air flowing from the air flow path envelopes at least a quarter of the rim in a direction traverse (T) to a longitudinal span (L) of the hand grip assembly as measured from the outlet.

9. The climate controlled assembly of claim 4 further including a slot, wherein the insert is disposed within the slot and divides the slot such that the air flowing from the slot is divided into a plurality of air flow regions.

10. The climate controlled assembly of claim 7 wherein the air flow path extends circumferentially 360 degrees around the rim.

11. The climate controlled assembly of claim 4 wherein the hand grip assembly is configured such that air flowing from the air flow path is directed along the tangential path to the external surface to entrain the air with a Coanda effect.

12. The climate controlled assembly of claim 4 wherein the air flow path further includes an outlet proximate to the tangential path and the outlet is disposed such that air flowing from the air flow path extends 10 millimeters or more from the outlet.

13. A steering wheel assembly for a motor vehicle comprising:
   a rim with an external surface and an internal surface, the external surface having a curvature, the rim defining an air channel with an air slot extending longitudinally with the external surface,
   an insert disposed within the air slot and comprising a wall, wherein a curvature of the insert wall follows a curvature of the internal surface; and
   wherein the air slot is configured such that air flowing from the air slot is directed between the insert wall and the internal surface, wherein the curvature of the insert wall and the curvature of the internal surface cause the air flowing from the air slot to flow along a tangential path to the external surface to cause air flowing from the air slot to envelope the external surface beyond a region adjacent to the air slot, wherein the insert divides the air slot such that the air flowing from the air slot is oriented in different directions.

14. The steering wheel assembly of claim 13 wherein the air slot comprises one or more air slots extending 360 degrees around the rim.

* * * * *